Figure 1:
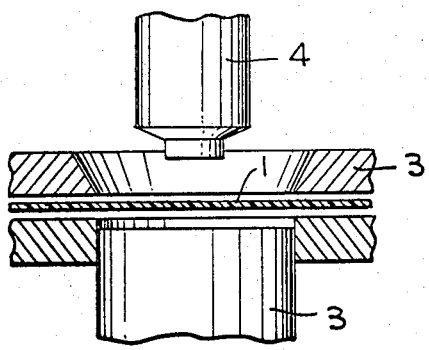

United States Patent [19]
Langecker

[11] 3,768,942
[45] Oct. 30, 1973

[54] DEVICE FOR PREPARING LABELS OR PLATES IN A BLOW MOLDING APPARATUS FROM THERMOPLASTIC ARTIFICIAL MATERIAL

[76] Inventor: Erhard Langecker, Hohuschner Weg, Meinerzhagen, Germany

[22] Filed: July 27, 1972

[21] Appl. No.: 275,493

Related U.S. Application Data
[62] Division of Ser. No. 132,574, April 8, 1971.

[52] U.S. Cl. .................... 425/126, 425/DIG. 210
[51] Int. Cl. ............................................ B29d 23/03
[58] Field of Search............ 425/109, 126, DIG. 210, 425/DIG. 812

[56] References Cited
UNITED STATES PATENTS

| | | | |
|---|---|---|---|
| 3,072,969 | 1/1963 | Du Bois | 425/DIG. 210 |
| 3,267,186 | 8/1966 | Battenfield | 425/DIG. 210 |
| 3,674,391 | 7/1972 | Welle | 425/109 |
| 3,272,681 | 9/1966 | Langecker | 425/DIG. 210 |
| 1,931,649 | 10/1933 | Eger | 425/DIG. 812 |
| 3,392,423 | 7/1968 | Heider et al. | 425/DIG. 812 |

Primary Examiner—J. Spencer Overholser
Assistant Examiner—David S. Safran
Attorney—Watson, Cole, Grindle & Watson

[57] ABSTRACT

A process and device for applying label and plates on hollow bodies of thermoplastic synthetic substances in which a blow mold has openings therein to guide a punch and is provided with grooves for ventilation purposes. The method includes the insertion of a thin foil into a blow mold and holding the foil in a curved position, corresponding to the curve of the hollow body and finally holding a punch during the blowing process and in a receding position in relation to the walls of the mold.

2 Claims, 9 Drawing Figures

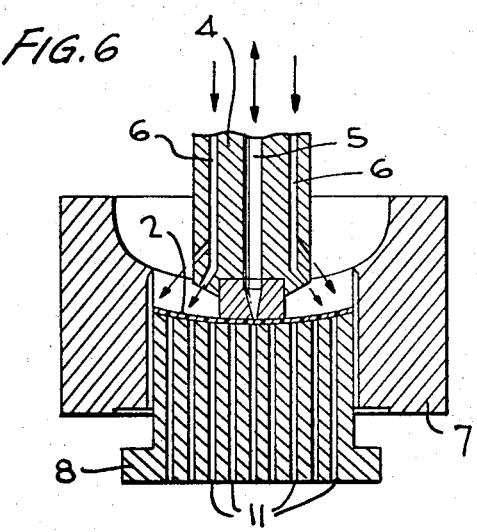
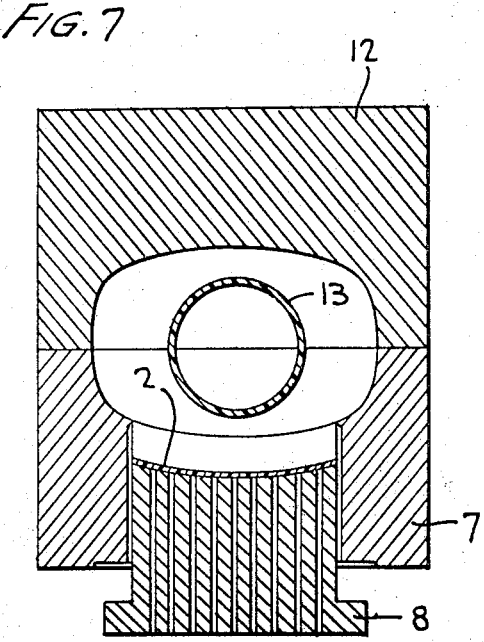
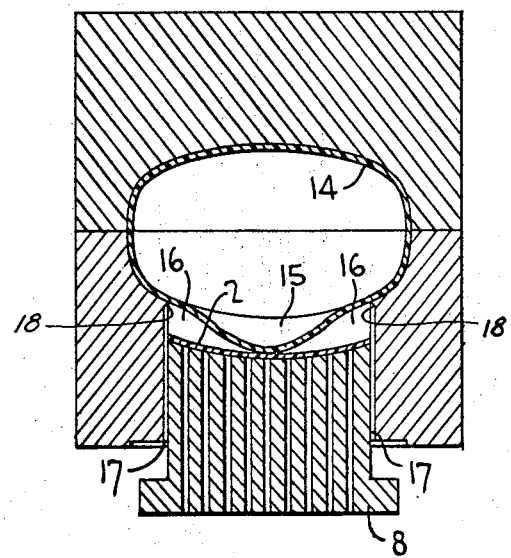
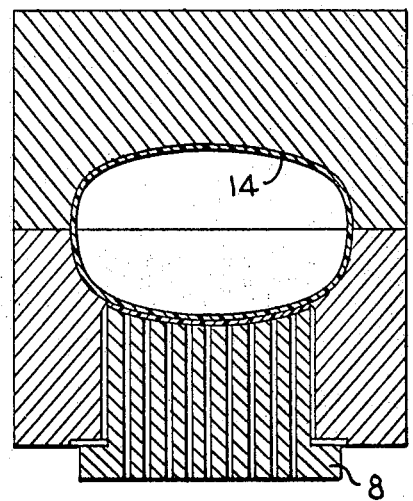

3,768,942

DEVICE FOR PREPARING LABELS OR PLATES IN A BLOW MOLDING APPARATUS FROM THERMOPLASTIC ARTIFICIAL MATERIAL

This is a division of application Ser. No. 132,574 filed Apr. 8, 1971 as a division of appn. Ser. No. 767,719 filed Oct. 15, 1968.

This invention relates to a process and device for the application of labels or plate slabs on hollow bodies made of a thermoplastic synthetic substance or material produced by a blowing process.

It is known to combine a colored, and/or printed part of a thin foil, made from a weldable or glueable raw material, inserted into the blow mold during the blowing of the hollow body, with the latter, whereby one can proceed in such a amnner that the part is delivered into it by insertion either from the outside through openings in the wall of the blow mold or from the inside through the partial plane of the blow mold.

In the case of such an application of a label or of a plate slab on a hollow body produced by blowing, an essential problem consists in that during the application of the label on the hollow body, the development of air bubbles between the hollow body and the label should be avoided. For this purpose hitherto the surface of the label or of the plate slab which comes into contact with the hollow body has been roughened in order to distribute the air, which has been enclosed between the label and the hollow body of necessity during the application evenly in the recesses is formed by the roughening and in order to avoid in this manner the development of spot-like bubbles. For the same purpose, the labels that are to be applied have also been produced from webs or from porous substances or else from perforated foils. Even though these foils essentially can be applied without the formation of bubbles, still they have considerable disadvantages which act against their use. The labels that are to be applied are always provided with illustrations and a text that has been printed thereon, and in order to avoid damage to the print by abrasion, transparent foils have been used which have been imprinted with the text thereon of their surfaces which are to be placed on the surface of the hollow body. In this process the roughening and the use of a web or of a performated foil has disadvantages since the clarity of the printed text will be impaired by the roughening on the surface. Besides that, the danger exists that the recesses in the surface of the foil existing as a result of the roughening or as a result of the use of a web, will be filled by the printers ink so that spot-like bubbles can occur on the printed large area places, since the possibility for an even distribution of the air does no longer exist here. The same thing is true for perforated foils which too, can influence the printed picture disadvantageously as again the perforations at the point of printing can be closed up by the ink so that here too the formation of bubbles cannot be reliably avoided. Therefore, in the interest of a clear reproduction of the text on the labels, one will be forced to use such foils as labels, which make possible a satisfactory and clear application of the printing of the text and the image. In the case of such a method, a punch is arranged slidably in the opening of the blow mold whose front surface has a curve corresponding to the curve of the hollow body. The label to be applied to the hollow body has been placed in any desired manner on the punch, for example, by hand or by stamping, and is held thereon in the correct position, whereby the punch can be provided with suction bores in order to hold the label. In this case one operates in such a manner that during the closing process of the blow mold, the punch carrying the label is moved into the final position of the mold so that upon blowing up the blank, the label is located in its final position in relation to the hollow body. In the case of this known design, bubbles between the label and the hollow body cannot be avoided if a label with a smooth surface is used, since the air located between the label and the hollow body cannot be drawn off during the blowing up of the hollow body. Therefore, in the case of this method too, one will be forced to use the disadvantageous roughened or perforated foils.

The invention of this application is based on the object of creating a possibility which will guarantee a bubble-free application of a label with a smooth surface onto a hollow body and thus permits the realization of the advantages inherent in the smooth foil.

According to the invention this will be achieved by the fact that the punch bearing the part, is held during the blowing process in a receding position in relation to the wall of the mold, and that it is pushed forward upon contact of the part by the blown blank into a final position of the mold corresponding to the finished hollow body, whereby the air located between the part and the blown blank is carried off. The invention is based on the realization that a bubble-free application of a label on a hollow body will only be guaranteed whenever the hollow body upon its contact with the label will first of all come to rest in the area of its center on the label, so that between the label and the hollow body on both sides of the center, intervals are formed which become larger and are wedge shaped and which are made to disappear with a gradual decrease by the movement of the punch into the surface of the mold. Thus the label achieves a complete bubble-free rest or fit on the hollow body, since the air in the interstices is carried off forceably toward the outside. In this case the forward movement of the punch must start whenever the blown blank comes to rest against the center of the label, whereby the forward movement must be controlled in such a manner that the punch carrying the label and receding in relation to the wall of the mold is moved into the final position of the mold upon contact with the label through the hose blank. In the case of the method of operation of stamping out the labels directly in the mold, one will therefore proceed in such a manner that the time of stamping and/or the movement are selected in such a manner that the contact of the label by way of the hose blank, also takes place in a receding position in relation to the wall of the mold and that only after that will it be pushed forward into the corresponding final position of the mold, whereby in this case too the air located between the part and the blow blank is carried off. In this manner a satisfactory bubble-free application of the label on the hollow body is guaranteed, so that the advantageous use of foils with a smooth upper surface is possible. A further characteristic feature consists in that the part stamped out of a foil band is taken up by a transfer element, is placed onto the punch and is pressed against its surface by blowing. This characteristic feature offers particular advantages in the case of blowing machines with several closing arrangements and blow molds, since the arrangement of a single stamping device is possible by way of which all blow molds can be served, by placing the label produced at the punching place, onto the punch of the individual blow molds by means of a transfer element and pressing it against the surface by blowing. In this manner one will achieve in the case of every individual blow mold, that the label is placed in a precisely correct position on the punch held in the receding position and is pressed against it by means of the positively guided transfer element. In the case of use of electrostatically charged foils, the label pressed onto the punch by means of the transfer element adheres safely on said punch, whereas in the case of electrically uncharged foils, the punch can be equipped in a known manner with suction bores.

A further object of the invention resides in that the opening of the blow mold guiding the punch has been provided with grooves serving for ventilation. The air which has been displaced between the label and the blow body during the forward movement of the punch will be conducted away at the edge of the label by the grooves arranged in the opening of the blow mold, so that a complete bubble-free fit of the label on the hollow body is guaranteed.

Also it is still essential for the invention that the transfer element is developed as a punch which has on its front surface one or several centrally projecting, elastic blast or suction nozzles, and a multiplicity of laterally arranged blast nozzles. The central nozzles of the transfer element developed as a punch are simultaneously suction and blast nozzles, while the laterally arranged nozzles are exclusively blast nozzles. In the case of removal of a label at the spot of punching, the central nozzles are used as suction nozzles which will hold the label for such a length of time until the transfer punch comes into contact with the punch arranged in the opening of the mold. When this has happened, the lateral blast nozzles are operated, which press the label against the surface of the punch, and in the case of lifting off the transfer punch, the central nozzles are fed blast air in order to separate the transfer punch from the label.

Figure 3:
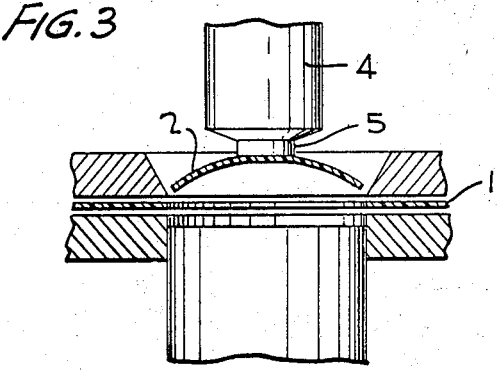
Figure 4:
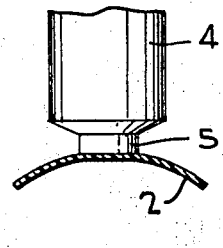
Figure 5:
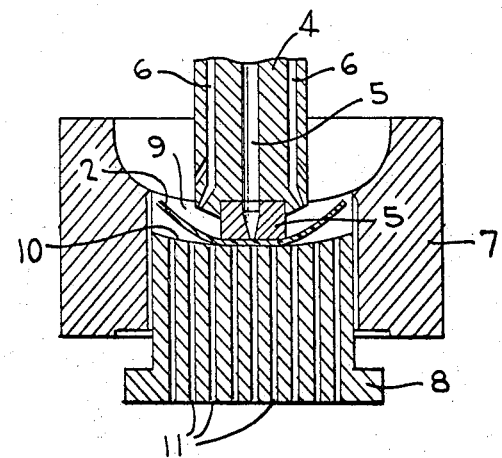

Further objects will be apparent from the following description when considered in connection with the accompanying drawings in which;

FIGS. 1 to 4 are schematic side views partly in section showing the punching device and the transfer punch in various operating positions, FIGS. 5 and 6 are sectional views showing one half of the mold upon application of a label on the punch located in the half of the mold, FIG. 7 is a sectional view of a schematic presentation of the closed mold with the unblown up hose blank, FIG. 8 is a sectional view of the presentation according to FIG. 7 with the hollow body blown up and coming into contact with the center of the label, and FIG. 9 is a sectional view according to FIGS. 7 and 8 with the punch in the final position in the mold.

Figure 2:
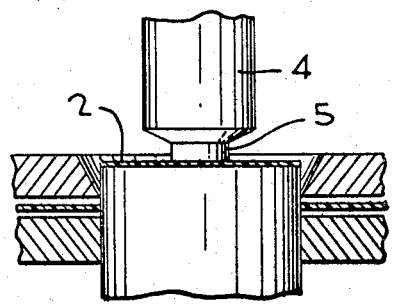

FIGS. 1 to 3 show a punching device where labels 2 are stamped out of a foil band 1 by means of a punching tool 3. The punched out label 2, FIG. 2, shows the label 2 taken over by a transfer punch 4. The transfer punch 4 has at its front surface a projecting elastic nozzle 5 and, as FIG. 5 shows, it has lateral nozzles 6. When taking over the label 2, the central elastic nozzle 5 is operated as a suction nozzle, whereby, according to FIG. 3, the label 2 is lifted out of the punching tool 3 and, as FIG. 4 shows, is moved to the mold half 7. Here, FIG. 5, the label 2 is pressed onto a punch 8 with the elastic nozzle 5, which punch is guided in an opening 9 of the mold half 7. The punch 8 has a front or top surface 10 which has been curved to correspond with the shape of the hollow body. Whenever the transfer punch 4 engages with the punch 8, FIG. 5, the nozzles 5 and 6 are operated according to FIG. 6 as blast nozzles, as a result of which the label 2 is pressed against the front surface 10 of punch 8. Suction bores 11 are provided in punch 8, by means of which the label 2 is held in the position shown in FIG. 6.

FIG. 7 shows the closed mold which consists of a lower mold half 7 and an upper mold half 12. In the mold halves 7 and 12, blank 13 developed as a hose has been blown up into a hollow body in the mold 7 and 12. As FIG. 8 shows, punch 8 remains during the blowing up of the hose blank 13, in its retracted position for such a length of time, until such blank has developed into a hollow body 14 fitting against the wall of the mold 7 and 12. During this time, as FIG. 8 shows, a pouch-like blow-out or bulge 15 develops at the place of the punch 8, whereby the pouch-like bulge comes to fit and contacts against the center of the label. Now the forward movement of punch 8 begins, into the final position in the mold shown in FIG. 9. As FIG. 8 shows, there are two wedge-shaped hollow spaces 16 which become wider starting out from the center of label 2 and between label 2 and the pouch-like bulge 15 which are filled with air. In the case of the forward movement of punch 8, from the position shown in FIG. 8, into the final position in the mold according to FIG. 9, these spaces are gradually decreased until they have completely disappeared, FIG. 9. During this time, the air is squeezed out from the middle of label 2 to both sides without there being any possibility for the formation of bubbles developing thereby between the label 2 and the bulge 15 of the hollow body 14. In order to be able to carry off without any difficulty the air pressed from spaces 16 during the movement of punch 8, grooves 17 have been provided in the opening 9 of the mold half 7, through which the air emerging from spaces 16 is carried off at the edge of label 2, so that a full fit of label 2 will be achieved on the entire surface. As seen in FIG. 8, the inner ends of grooves 17 are closed thereby substantially avoiding any gaps or imprints on the blown hollow body in the fully closed position of FIG. 9. The label may protrude in relation to the hollow body, which can also be arranged sunk or depressed into the hollow body, in such a manner that its outside surface lies flush with the surface of the hollow body.

I claim:

1. An apparatus for applying labels onto hollow bodies, comprising: a blow mold having a cavity for containing a hollow body; a bore in said mold opening into said cavity; a member movable within said bore from a withdrawn to a mold-closing position at which it forms a section of said cavity, one end of said member having a curvature corresponding to the curvature of said mold cavity and being adapted to receive a label thereon to be applied onto the hollow body in said cavity when said member is in its mold-closing position; and said mold having ventilation openings in communication with said cavity for venting any air out of said mold which may be present between the label and hollow body during movement of said member toward its mold-closing position, said ventilation openings comprising grooves disposed substantially along the entire length of the wall of said bore, each of said grooves being closed at their respective inner ends at said cavity, the apparatus further including a transfer device for picking up the label from a supply station and transferring it to said one end of said member.

2. The apparatus according to claim 1 wherein said transfer device is provided with duct means for applying both suction to one end of said transfer device to thereby hold the label in place during pick-up, and for applying positive pressure through said device one end to thereby transfer the label to said member one end.

* * * * *